United States Patent
He et al.

(10) Patent No.: US 11,629,914 B2
(45) Date of Patent: Apr. 18, 2023

(54) ENERGY-EFFICIENT PROCESS FOR PREPARING NITROGEN AND OXYGEN FOR GLASS MELTING FURNACE

(71) Applicant: Hangzhou Turning Energy Technology Development Co., Ltd., Zhejiang (CN)

(72) Inventors: Senlin He, Zhejiang (CN); Ting Wei, Zhejiang (CN); Lei Guo, Zhejiang (CN); Youzhen Zhou, Zhejiang (CN); Zhengjun Yang, Zhejiang (CN); Hang Zhu, Zhejiang (CN); Yunfeng Zhang, Zhejiang (CN)

(73) Assignee: Hangzhou Turning Energy Technology Development Co., Ltd., Hangzhou (CN)

( * ) Notice: Subject to any disclaimer, the term of this patent is extended or adjusted under 35 U.S.C. 154(b) by 0 days.

(21) Appl. No.: 17/839,476

(22) Filed: Jun. 13, 2022

(65) Prior Publication Data
US 2023/0034371 A1 Feb. 2, 2023

(30) Foreign Application Priority Data
Jul. 28, 2021 (CN) .......................... 202110858748.5

(51) Int. Cl.
*F25J 3/04* (2006.01)

(52) U.S. Cl.
CPC ....... *F25J 3/04424* (2013.01); *F25J 3/04109* (2013.01); *F25J 3/04181* (2013.01);
(Continued)

(58) Field of Classification Search
CPC .. F25J 3/04454; F25J 3/04181; F25J 3/04284; F25J 3/04309; F25J 3/04351; F25J 3/04424
See application file for complete search history.

(56) References Cited

U.S. PATENT DOCUMENTS

| | | | | |
|---|---|---|---|---|
| 5,402,647 A | * | 4/1995 | Bonaquist | F25J 3/04284 62/651 |
| 5,918,482 A | * | 7/1999 | Potempa | F25J 3/04454 62/646 |
| 6,460,373 B1 | * | 10/2002 | Bergman, Jr. | F25J 3/04303 62/652 |

FOREIGN PATENT DOCUMENTS

| | | |
|---|---|---|
| CN | 102538397 A | 7/2012 |
| CN | 104807291 A | 7/2015 |

(Continued)

OTHER PUBLICATIONS

1st Office Action of counterpart Chinese Patent Application No. 202110858748.5 dated Jan. 7, 2022.
(Continued)

*Primary Examiner* — John F Pettitt, III

(57) ABSTRACT

The present disclosure provides an energy-efficient process for preparing nitrogen and oxygen for a glass melting furnace. A device required by the process includes a filter, a turbine air compressor, an air pre-cooling unit, alternately used molecular sieve adsorbers, an electric heater, a main heat exchanger, a rectifying tower I, a main condenser-evaporator I, a rectifying tower II, a main condenser-evaporator II, a rectifying tower III, a main condenser-evaporator III, a supercooler, an expander I and an expander II. The three rectifying towers are used to prepare a low-pressure nitrogen product and an oxygen product with a certain pressure at the same time. The oxygen product with a certain pressure is used for oxygen-enriched combustion for the glass melting furnace, and the low-pressure nitrogen product is used as shielding gas of a tin bath.

3 Claims, 1 Drawing Sheet

(52) U.S. Cl.
CPC ....... *F25J 3/04284* (2013.01); *F25J 3/04351* (2013.01); *F25J 3/04454* (2013.01); *F25J 2200/20* (2013.01); *F25J 2215/42* (2013.01); *F25J 2215/50* (2013.01)

(56) References Cited

FOREIGN PATENT DOCUMENTS

| CN | 108061428 A | 5/2018 |
| CN | 207716722 U | 8/2018 |
| CN | 207865821 U | 9/2018 |

OTHER PUBLICATIONS

Notice of Allowance of counterpart Chinese Patent Application No. 202110858748.5 dated Mar. 23, 2022.

* cited by examiner

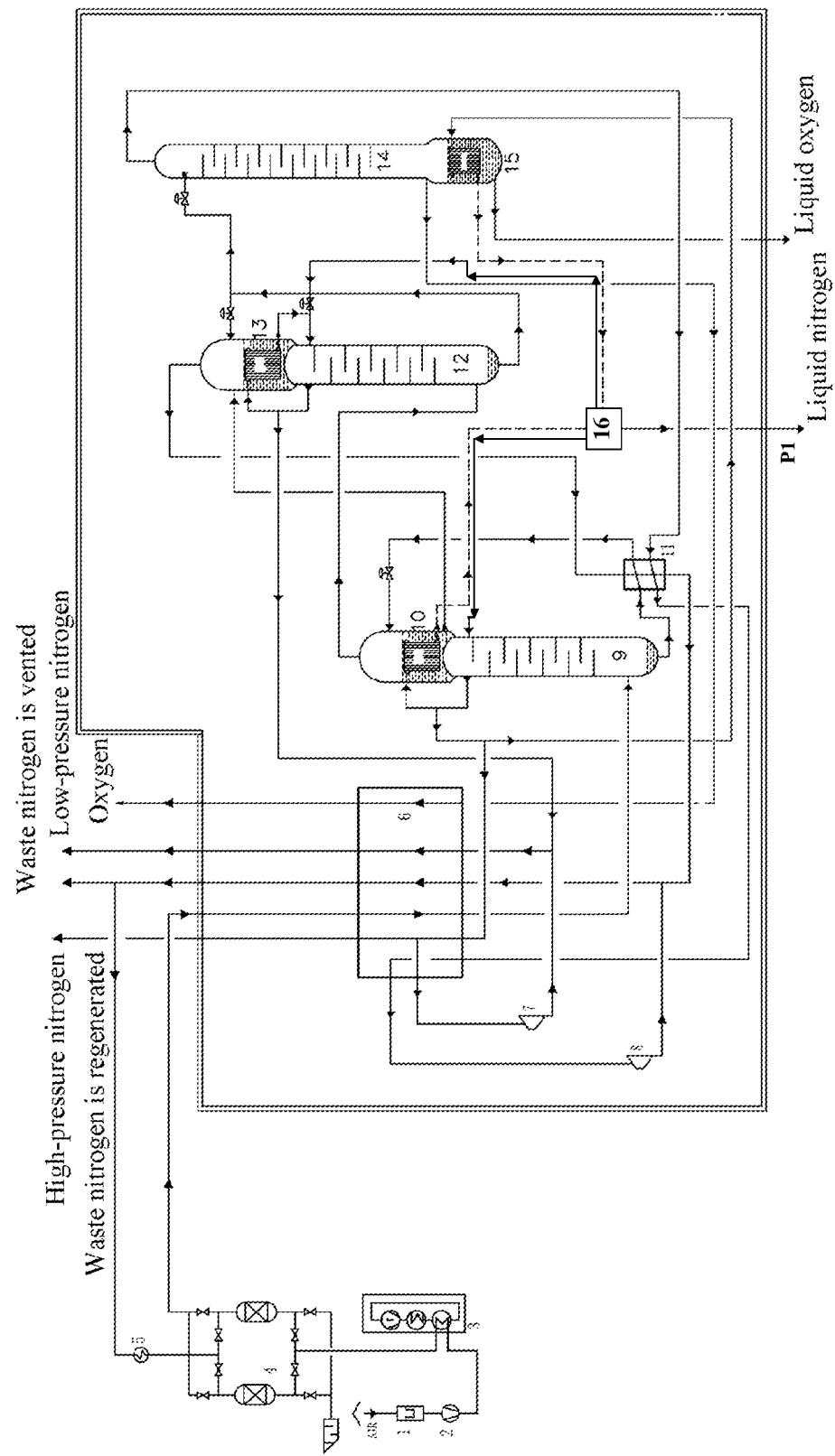

ENERGY-EFFICIENT PROCESS FOR PREPARING NITROGEN AND OXYGEN FOR GLASS MELTING FURNACE

CROSS REFERENCE TO RELATED APPLICATION

The present application claims priority from Chinese Patent Application No. 202110858748.5 filed on Jul. 28, 2021, the contents of which are incorporated herein by reference in their entirety.

TECHNICAL FIELD

The present disclosure relates to the technical field of air separation, in particular to an energy-efficient process for preparing nitrogen and oxygen for a glass melting furnace.

BACKGROUND

A glass melting furnace is an energy-intensive facility, which accounts for about 70% of energy used in glass production. Oxygen-enriched combustion is an energy-saving technique. Oxygen is supplied into the traditional glass melting furnace to increase the oxygen content in a specific area, which can increase the combustion reaction speed and widens the combustibility range, thereby increasing the combustion efficiency, flame temperature and heat transfer efficiency, and significantly increasing the melting rate of glass. Correspondingly, the exhaust emissions and the heat loss carried away by flue gas can be reduced, and the $NO_x$ emissions can also be reduced, thereby achieving the goals of improving the output and quality of glass, saving the energy and reducing the environmental pollution. Besides, nitrogen with a certain pressure needs to be prepared as shielding gas of a tin bath during the production of the glass melting furnace.

The preparation of oxygen and nitrogen needs electric power, which will increase the production cost of glass to some extent. Therefore, in order to promote the oxygen-enriched combustion technique, it is crucial to develop an energy-efficient process for preparing oxygen and pressurized nitrogen suitable for the glass melting furnace.

SUMMARY

The present disclosure provides an energy-efficient process for preparing nitrogen and oxygen for a glass melting furnace to solve the problems in the prior art.

The present disclosure adopts the following technical solutions:

Provided is an energy-efficient process for preparing nitrogen and oxygen for a glass melting furnace. A device required by the process includes a filter, a turbine air compressor, an air pre-cooling unit, alternately used molecular sieve adsorbers, an electric heater, a main heat exchanger, a rectifying tower I, a main condenser-evaporator I, a rectifying tower II, a main condenser-evaporator II, a rectifying tower III, a main condenser-evaporator III, a supercooler, an expander I and an expander II.

The filter, the turbine air compressor, the air pre-cooling unit, the alternately used molecular sieve adsorbers and the electric heater are disposed outside a cold box, the main heat exchanger, the rectifying tower I, the main condenser-evaporator I, the rectifying tower II, the main condenser-evaporator II, the rectifying tower III, the main condenser-evaporator III, the supercooler, the expander I and the expander II are disposed inside the cold box, the main condenser-evaporator I is disposed on the rectifying tower I, the main condenser-evaporator II is disposed on the rectifying tower II, and the main condenser-evaporator III is disposed at a bottom of the rectifying tower III.

The filter, the turbine air compressor, the air pre-cooling unit, the alternately used molecular sieve adsorbers and the main heat exchanger are connected sequentially, and the main heat exchanger is connected to a raw air inlet at a bottom of the rectifying tower I.

A liquid air outlet at the bottom of the rectifying tower I is connected to the supercooler, the supercooler is connected to the main condenser-evaporator I, a connecting pipe between the supercooler and the main condenser-evaporator I is provided with a throttle valve, an oxygen-enriched air outlet of the main condenser-evaporator I is connected to a bottom of the rectifying tower II, and a liquid air outlet of the main condenser-evaporator I is connected to the main condenser-evaporator II.

A pressurized nitrogen outlet at a top of the rectifying tower I is respectively connected to pressurized nitrogen reheating/partial reheating inlets of the main condenser-evaporator I, the main condenser-evaporator III and the main heat exchanger, a liquid nitrogen outlet of the main condenser-evaporator I is connected to a liquid nitrogen buffer tank, the liquid nitrogen buffer tank is respectively connected to the top of the rectifying tower I, a top of the rectifying tower II and a liquid nitrogen product supply pipe, and a connecting pipe between the liquid nitrogen buffer tank and the top of the rectifying tower II is provided with a throttle valve. A pressurized nitrogen reheating outlet and a pressurized nitrogen partial reheating outlet of the main heat exchanger are respectively connected to a high-pressure nitrogen product supply pipe and the expander I, the expander I is connected to a low-pressure nitrogen reheating inlet of the main heat exchanger, and a low-pressure nitrogen reheating outlet of the main heat exchanger is connected to a low-pressure nitrogen product supply pipe.

An oxygen-enriched liquid air outlet at the bottom of the rectifying tower II is respectively connected to the main condenser-evaporator II and a top of the rectifying tower III, and connecting pipes between the oxygen-enriched liquid air outlet at the bottom of the rectifying tower II and the main condenser-evaporator II and between the oxygen-enriched liquid air outlet at the bottom of the rectifying tower II and the top of the rectifying tower III are respectively provided with a throttle valve. A waste nitrogen outlet of the main condenser-evaporator II is connected to the supercooler, the supercooler is connected to a waste nitrogen reheating inlet of the main heat exchanger, a waste nitrogen reheating outlet of the main heat exchanger is respectively connected to a vent pipe and the electric heater, and the electric heater is connected to the alternately used molecular sieve adsorbers.

A low-pressure nitrogen outlet at the top of the rectifying tower II is respectively connected to low-pressure nitrogen reheating inlets of the main condenser-evaporator II and the main heat exchanger, and a liquid nitrogen outlet of the main condenser-evaporator II is connected to the top of the rectifying tower II.

The main condenser-evaporator III is located at the bottom of the rectifying tower III, an oxygen outlet of the rectifying tower III is connected to the main heat exchanger, the main heat exchanger is connected to an oxygen product supply pipe, a liquid nitrogen outlet of the main condenser-evaporator III is connected to the liquid nitrogen buffer tank, and a liquid oxygen outlet of the rectifying tower III is connected to a liquid oxygen product supply pipe.

Pressurized waste nitrogen at the top of the rectifying tower III is connected to the supercooler, the supercooler is connected to a pressurized waste nitrogen partial reheating inlet of the main heat exchanger, a pressurized waste nitrogen partial reheating outlet of the main heat exchanger is connected to the expander II, and the expander II is connected to the waste nitrogen reheating inlet of the main heat exchanger.

The process includes the following steps:

step I: after dust and mechanical impurities are removed from raw air through the filter, sending the filtered raw air to the turbine air compressor such that the air is compressed to a set pressure; then pre-cooling the air by the air pre-cooling unit, and purifying the air by the alternately used molecular sieve adsorbers;

step II: a part of the purified raw air serves as instrument air, and the remaining part is sent to the main heat exchanger such that the purified raw air is cooled to a saturation temperature and has a certain moisture content, which is then sent into the bottom of the rectifying tower I to participate in rectification;

step III: after the air is rectified by the rectifying tower I, obtaining liquid air and pressurized nitrogen, enabling the liquid air to be supercooled by the supercooler, throttled by the throttle valve and sent into the main condenser-evaporator I to exchange heat with the pressurized nitrogen as a cold source such that the liquid air is vaporized into oxygen-enriched air, introducing the oxygen-enriched air into the bottom of the rectifying tower II to participate in rectification, and at the same time, introducing a part of the liquid air from the main condenser-evaporator I into the main condenser-evaporator II to serve as the cold source; introducing a part of the pressurized nitrogen into the main condenser-evaporator I to exchange heat with the liquid air as a heat source such that the pressurized nitrogen is liquefied into liquid nitrogen, combining the liquid nitrogen with liquid nitrogen introduced from the main condenser-evaporator III, introducing a part of the combined liquid nitrogen into the top of the rectifying tower I to serve as a reflux, enabling another part of the combined liquid nitrogen to be throttled by the throttle valve and introduced into the top of the rectifying tower II to participate in rectification, and discharging the remaining part of the combined liquid nitrogen as a liquid nitrogen product; introducing a part of the pressurized nitrogen into the main condenser-evaporator III to serve as a heat source, enabling a part of the pressurized nitrogen to be reheated by the main heat exchanger and sent out of the cold box to serve as a high-pressure nitrogen product having a purity of less than 3 ppm $O_2$ and a pressure of 0.68-0.95 MpaG, and enabling the remaining part of the pressurized nitrogen to be partially reheated by the main heat exchanger, expanded by the expander I, reheated by the main heat exchanger and sent out of the cold box to serve as a low-pressure nitrogen product having a purity of less than 3 ppm $O_2$ and a pressure of 0.3-0.5 MpaG;

step IV: after the liquid nitrogen and the oxygen-enriched air are rectified by the rectifying tower II, obtaining oxygen-enriched liquid air from the bottom of the rectifying tower II, and obtaining low-pressure nitrogen from the top of the rectifying tower II; enabling a part of the oxygen-enriched liquid air to be throttled by the throttle valve and sent into the main condenser-evaporator II to exchange heat with the low-pressure nitrogen as a cold source such that the oxygen-enriched liquid air is vaporized into waste nitrogen, enabling the waste nitrogen to be reheated by the supercooler and the main heat exchanger and sent out of the cold box, enabling a part of the waste nitrogen to serve as regeneration gas of the alternately used molecular sieve adsorbers and the remaining part to be vented, and enabling the remaining part of the oxygen-enriched liquid air to be throttled by the throttle valve and sent into the top of the rectifying tower III to participate in rectification; introducing a part of the low-pressure nitrogen into the main condenser-evaporator II to exchange heat with the oxygen-enriched liquid air as a heat source such that the low-pressure nitrogen is liquefied into liquid nitrogen, introducing the liquid nitrogen into the top of the rectifying tower II to serve as a reflux, and reheating the remaining part of the low-pressure nitrogen by the main heat exchanger to serve as a low-pressure nitrogen product having a purity of less than 3 ppm $O_2$ and a pressure of 0.3-0.5 MpaG;

step V: after the oxygen-enriched liquid air is rectified by the rectifying tower III, obtaining liquid oxygen and pressurized waste nitrogen, enabling the liquid oxygen to serve as a cold source of the main condenser-evaporator III and exchange heat with the pressurized nitrogen introduced from the rectifying tower I such that the liquid oxygen is vaporized into gaseous oxygen, and enabling a part of the gaseous oxygen to be reheated by the main heat exchanger and sent out of the cold box as an oxygen product and the remaining part of the gaseous oxygen to serve as uprising gas of the rectifying tower III, wherein the oxygen product has a purity of 90-99.6% and a pressure of 0.1-0.3 MpaG; liquefying the pressurized nitrogen into liquid nitrogen, combining the liquid nitrogen with liquid nitrogen introduced from the main condenser-evaporator I, introducing a part of the combined liquid nitrogen into the top of the rectifying tower I to serve as a reflux, enabling a part of the combined liquid nitrogen to be throttled by the throttle valve and introduced into the top of the rectifying tower II to participate in rectification, discharging the remaining part of the combined liquid nitrogen as the liquid nitrogen product, and at the same time, introducing a part of the liquid oxygen from the bottom of the rectifying tower III to serve as a liquid oxygen product; and enabling the pressurized waste nitrogen to be reheated by the supercooler, partially reheated by the main heat exchanger and expanded by the expander II, then enabling the expanded waste nitrogen to be reheated by the main heat exchanger and sent out of the cold box, and enabling a part of the obtained waste nitrogen to serve as the regeneration gas of the alternately used molecular sieve adsorbers and the remaining part to be vented.

Further, in step I, the air is compressed by the turbine air compressor to 0.75-1.0 MPa.

Further, in step I, the air is pre-cooled by the air pre-cooling unit to 5-8° C.

Further, in step III, the pressurized nitrogen has a pressure of 0.68-0.95 MpaG.

Further, in step IV, the low-pressure nitrogen has a pressure of 0.3-0.5 MpaG.

Beneficial Effects of the Present Disclosure:

1. The three rectifying towers are used to prepare a low-pressure nitrogen product (less than 3 ppm $O_2$, 0.3-0.5 MpaG) and an oxygen product with a certain pressure (90-99.6%, 0.1-0.3 MpaG) at the same time. The oxygen product with a certain pressure is used for oxygen-enriched combustion for the glass melting furnace, and the low-pressure nitrogen product is used as shielding gas of a tin bath. When necessary, a high-pressure nitrogen gas product can also be provided.

2. The low-pressure nitrogen product can be prepared at a high extraction yield. The low-pressure nitrogen product can serve as shielding gas of the tin bath.

3. According to the present disclosure, a part of the oxygen-enriched liquid air is introduced from the bottom of the rectifying tower II into the rectifying tower III to participate in rectification. Owing to the higher oxygen content in the oxygen-enriched liquid air at the bottom of the rectifying tower II, the separation work of the rectifying tower III can be reduced, which can make the number of the rectifying plates smaller, enhance the extraction efficiency of the rectifying tower III and increase the yield of oxygen.

4. The pressurized nitrogen and the returning pressurized waste nitrogen are expanded, so that the pressure energy of the high-pressure and low-pressure systems is fully utilized, and the refrigerating capacity of the device can be enhanced. Besides, a part of the liquid oxygen and liquid nitrogen products can be produced while satisfying the cold loss of the device.

5. While satisfying the minimum heat exchange temperature of the rectifying tower II and the main condenser-evaporator II, since the liquid air entering the main condenser-evaporator I has a lower oxygen content than that of the oxygen-enriched liquid air in the rectifying tower II, the pressure of the air entering the rectifying tower I can be reduced, so that the discharge pressure of the air compressor can be reduced and the overall energy consumption of the device can be reduced.

BRIEF DESCRIPTION OF THE DRAWINGS

The sole figure is a schematic structural diagram of a device required by the energy-efficient process for preparing nitrogen and oxygen for a glass melting furnace according to the present disclosure.

DETAILED DESCRIPTION

The present disclosure is further described below with reference to the embodiments and the accompanying drawings. The following examples are only used to illustrate the present disclosure, but are not intended to limit the scope of implementation of the present disclosure.

An energy-efficient process for preparing nitrogen and oxygen for a glass melting furnace is realized by using a device shown in sole figure.

The device includes a filter 1, a turbine air compressor 2, an air pre-cooling unit 3, alternately used molecular sieve adsorbers 4, an electric heater 5, a main heat exchanger 6, a rectifying tower I 9, a main condenser-evaporator I 10, a rectifying tower II 12, a main condenser-evaporator II 13, a rectifying tower III 14, a main condenser-evaporator III 15, a supercooler 11, an expander I 7 and an expander II 8.

The filter 1, the turbine air compressor 2, the air pre-cooling unit 3, the alternately used molecular sieve adsorbers 4 and the electric heater 5 are disposed outside a cold box, the main heat exchanger 6, the rectifying tower I 9, the main condenser-evaporator I 10, the rectifying tower II 12, the main condenser-evaporator II 13, the rectifying tower III 14, the main condenser-evaporator III 15, the supercooler 11, the expander I 7 and the expander II 8 are disposed inside the cold box, the main condenser-evaporator I 10 is disposed on the rectifying tower I 9, the main condenser-evaporator II 13 is disposed on the rectifying tower II 12, and the main condenser-evaporator III 15 is disposed at a bottom of the rectifying tower III 14.

The filter 1, the turbine air compressor 2, the air pre-cooling unit 3, the alternately used molecular sieve adsorbers 4 and the main heat exchanger 6 are connected sequentially, and the main heat exchanger 6 is connected to a raw air inlet at a bottom of the rectifying tower I 9.

A liquid air outlet at the bottom of the rectifying tower I 9 is connected to the supercooler 11, the supercooler 11 is connected to the main condenser-evaporator I 10, a connecting pipe between the supercooler 11 and the main condenser-evaporator I 10 is provided with a throttle valve, an oxygen-enriched air outlet of the main condenser-evaporator I 10 is connected to a bottom of the rectifying tower II 12, and a liquid air outlet of the main condenser-evaporator I 10 is connected to the main condenser-evaporator II 13.

A pressurized nitrogen outlet at a top of the rectifying tower I 9 is respectively connected to pressurized nitrogen reheating/partial reheating inlets of the main condenser-evaporator I 10, the main condenser-evaporator III 15 and the main heat exchanger 6, a liquid nitrogen outlet of the main condenser-evaporator I 10 is connected to a liquid nitrogen buffer tank 16, the liquid nitrogen buffer tank 16 is respectively connected to the top of the rectifying tower I 9, a top of the rectifying tower II 12 and a liquid nitrogen product supply pipe P1, and a connecting pipe between the liquid nitrogen buffer tank 16 and the top of the rectifying tower II 12 is provided with a throttle valve. A pressurized nitrogen reheating outlet and a pressurized nitrogen partial reheating outlet of the main heat exchanger 6 are respectively connected to a high-pressure nitrogen product supply pipe and the expander I 7, the expander I 7 is connected to a low-pressure nitrogen reheating inlet of the main heat exchanger 6, and a low-pressure nitrogen reheating outlet of the main heat exchanger 6 is connected to a low-pressure nitrogen product supply pipe.

An oxygen-enriched liquid air outlet at the bottom of the rectifying tower II 12 is respectively connected to the main condenser-evaporator II 13 and a top of the rectifying tower III 14, and connecting pipes between the oxygen-enriched liquid air outlet at the bottom of the rectifying tower II 12 and the main condenser-evaporator II 13 and between the oxygen-enriched liquid air outlet at the bottom of the rectifying tower II 12 and the top of the rectifying tower III 14 are respectively provided with a throttle valve. A waste nitrogen outlet of the main condenser-evaporator II 10 is connected to the supercooler 11, the supercooler 11 is connected to a waste nitrogen reheating inlet of the main heat exchanger 6, a waste nitrogen reheating outlet of the main heat exchanger 6 is respectively connected to a vent pipe and the electric heater 5, and the electric heater 5 is connected to the alternately used molecular sieve adsorbers 4.

A low-pressure nitrogen outlet at the top of the rectifying tower II 12 is respectively connected to low-pressure nitrogen reheating inlets of the main condenser-evaporator II 13 and the main heat exchanger 6, and a liquid nitrogen outlet of the main condenser-evaporator II 13 is connected to the top of the rectifying tower II 12.

The main condenser-evaporator III 15 is located at the bottom of the rectifying tower III 14, an oxygen outlet of the rectifying tower III 14 is connected to the main heat exchanger 6, the main heat exchanger 6 is connected to an oxygen product supply pipe, a liquid nitrogen outlet of the main condenser-evaporator III 15 is connected to the liquid nitrogen buffer tank, and a liquid oxygen outlet of the rectifying tower III 14 is connected to a liquid oxygen product supply pipe.

Pressurized waste nitrogen at the top of the rectifying tower III 14 is connected to the supercooler 11, the supercooler 11 is connected to a pressurized waste nitrogen partial reheating inlet of the main heat exchanger 6, a pressurized waste nitrogen partial reheating outlet of the main heat exchanger 6 is connected to the expander II 8, and the expander II 8 is connected to the waste nitrogen reheating inlet of the main heat exchanger 6.

The components above have the following functions:

The filter 1 is used to remove dust and mechanical impurities in raw air.

The turbine air compressor 2 is used to compress the filtered raw air to a set pressure.

The air pre-cooling unit 3 is used to pre-cool the filtered and compressed raw air.

The alternately used molecular sieve adsorbers 4 are used to purify the filtered, compressed and pre-cooled raw air to remove moisture, $CO_2$, $C_2H_2$, etc.

The electric heater 5 is used to heat waste nitrogen to regenerate the alternately used molecular sieve adsorbers 4.

The main heat exchanger 6 is used to cool the purified raw air, partially reheat the pressurized nitrogen and the pressurized waste nitrogen, and reheat the pressurized nitrogen, the nitrogen obtained after expansion of the pressurized nitrogen, the waste nitrogen, the low-pressure nitrogen, the oxygen, and the waste nitrogen obtained after the expansion of the pressurized waste nitrogen.

The rectifying tower I 9 is used to rectify the raw air to obtain liquid air and pressurized nitrogen.

The main condenser-evaporator I 10 is used to exchange heat between the liquid air and the pressurized nitrogen, such that the liquid air is vaporized into oxygen-enriched air and the pressurized nitrogen is liquefied into liquid nitrogen.

The rectifying tower II 12 is used to rectify the liquid nitrogen and the oxygen-enriched air to obtain low-pressure nitrogen and oxygen-enriched liquid air.

The main condenser-evaporator II 13 is used to exchange heat between the oxygen-enriched liquid air and the low-pressure nitrogen, such that the oxygen-enriched liquid air is vaporized into waste nitrogen and the low-pressure nitrogen is liquefied into liquid nitrogen.

The rectifying tower III 14 is used to rectify the oxygen-enriched liquid air to obtain liquid oxygen and pressurized waste nitrogen.

The main condenser-evaporator III 15 is used to exchange heat between the liquid oxygen and the pressurized nitrogen, such that the liquid oxygen is vaporized into gaseous oxygen and the pressurized nitrogen is liquefied into liquid nitrogen.

The supercooler 11 is used to supercool the liquid air and superheat the waste nitrogen and the pressurized waste nitrogen.

The expander I 7 is used to expand the pressurized nitrogen that has been partially reheated by the main heat exchanger 6, so as to obtain cooling capacity.

The expander II 8 is used to expand the pressurized waste nitrogen that has been partially reheated by the main heat exchanger 6, so as to obtain cooling capacity.

The process includes the following steps:

Step I: After dust and mechanical impurities are removed from raw air through the filter 1, the filtered raw air is sent to the turbine air compressor 2 such that the air is compressed to a set pressure of 0.75-1.0 MPa. Then the air is pre-cooled to 5-8° C. by the air pre-cooling unit 3, and purified by the alternately used molecular sieve adsorbers 4 to remove moisture, $CO_2$, $C_2H_2$, etc.

Step II: A part of the purified raw air serves as instrument air (not shown), and the remaining part is sent to the main heat exchanger 6 such that the purified raw air is cooled to a saturation temperature and has a certain moisture content, which is then sent into the bottom of the rectifying tower I 9 to participate in rectification.

Step III: After the air is rectified by the rectifying tower I 9, liquid air and pressurized nitrogen (with a pressure of 0.68-0.95 MpaG) are obtained. The liquid air to be supercooled by the supercooler 11, throttled by the throttle valve and sent into the main condenser-evaporator I 10 to exchange heat with the pressurized nitrogen as a cold source such that the liquid air is vaporized into oxygen-enriched air. The oxygen-enriched air is introduced into the bottom of the rectifying tower II 12 to participate in rectification, and at the same time, a part of the liquid air is introduced from the main condenser-evaporator I 10 into the main condenser-evaporator II 13 to serve as the cold source. A part of the pressurized nitrogen is introduced into the main condenser-evaporator I 10 to exchange heat with the liquid air as a heat source such that the pressurized nitrogen is liquefied into liquid nitrogen. The liquid nitrogen is combined with liquid nitrogen introduced from the main condenser-evaporator III 15. A part of the combined liquid nitrogen is introduced into the top of the rectifying tower I 9 to serve as a reflux, another part of the combined liquid nitrogen is throttled by the throttle valve and introduced into the top of the rectifying tower II 12 to participate in rectification, and the remaining part of the combined liquid nitrogen is discharged as a liquid nitrogen product. A part of the pressurized nitrogen is introduced into the main condenser-evaporator III 15 to serve as a heat source, a part of the pressurized nitrogen is reheated by the main heat exchanger 6 and sent out of the cold box to serve as a high-pressure nitrogen product (having a purity of less than 3 ppm $O_2$ and a pressure of 0.68-0.95 MpaG), and the remaining part of the pressurized nitrogen is partially reheated by the main heat exchanger 6, expanded by the expander I 7, reheated by the main heat exchanger 6 and sent out of the cold box to serve as a low-pressure nitrogen product (having a purity of less than 3 ppm $O_2$ and a pressure of 0.3-0.5 MpaG).

Step IV: After the liquid nitrogen and the oxygen-enriched air are rectified by the rectifying tower II 12, oxygen-enriched liquid air is obtained from the bottom of the rectifying tower II 12, and low-pressure nitrogen (with a pressure of 0.3-0.5 MpaG) is obtained from the top of the rectifying tower II 12. A part of the oxygen-enriched liquid air is throttled by the throttle valve and sent into the main condenser-evaporator II 13 to exchange heat with the low-pressure nitrogen as a cold source such that the oxygen-enriched liquid air is vaporized into waste nitrogen, and the waste nitrogen is reheated by the supercooler 11 and the main heat exchanger 6 and sent out of the cold box. A part of the waste nitrogen serves as regeneration gas of the alternately used molecular sieve adsorbers 4, and the remaining part is vented. The remaining part of the oxygen-enriched liquid air is throttled by the throttle valve and sent into the top of the rectifying tower III 14 to participate in rectification. A part of the low-pressure nitrogen is introduced into the main condenser-evaporator II 13 to exchange heat with the oxygen-enriched liquid air as a heat source such that the low-pressure nitrogen is liquefied into liquid nitrogen, the liquid nitrogen is introduced into the top of the rectifying tower II 12 to serve as a reflux, and the remaining part of the low-pressure nitrogen is reheated by the main heat exchanger 6 to serve as a low-pressure nitrogen product (having a purity of less than 3 ppm $O_2$ and a pressure of 0.3-0.5 MpaG).

Step V: After the oxygen-enriched liquid air is rectified by the rectifying tower III 14, liquid oxygen and pressurized waste nitrogen (with a pressure of 0.25-0.35 MpaG) are obtained. The liquid oxygen serves as a cold source of the main condenser-evaporator III 15 and exchanges heat with the pressurized nitrogen introduced from the rectifying tower I 9 such that the liquid oxygen is vaporized into gaseous oxygen. A part of the gaseous oxygen is reheated by the main heat exchanger 6 and sent out of the cold box as an oxygen product (having a purity of 90-99.6% and a pressure of 0.1-0.3 MpaG), and the remaining part of the gaseous oxygen serves as uprising gas of the rectifying tower III 14. The pressurized nitrogen is liquefied into liquid nitrogen. The liquid nitrogen is combined with liquid nitrogen introduced from the main condenser-evaporator I 10. A part of the combined liquid nitrogen is introduced into the top of the rectifying tower I 9 to serve as a reflux, a part of the combined liquid nitrogen is throttled by the throttle valve and introduced into the top of the rectifying tower II 12 to participate in rectification, and the remaining part of the combined liquid nitrogen is discharged as the liquid nitrogen product. At the same time, a part of the liquid oxygen is introduced from the bottom of the rectifying tower III 14 to serve as a liquid oxygen product. The pressurized waste nitrogen is reheated by the supercooler 11, partially reheated by the main heat exchanger 6 and expanded by the expander II 8. Then the expanded waste nitrogen is reheated by the main heat exchanger 6 and sent out of the cold box. A part of the obtained waste nitrogen serves as the regeneration gas of the alternately used molecular sieve adsorbers 4, and the remaining part is vented.

What is claimed is:

1. A process for preparing nitrogen and oxygen for a glass melting furnace, wherein a device required by the process comprises a filter, an air compressor, an air pre-cooling unit, alternately used molecular sieve adsorbers, an electric heater, a main heat exchanger, a rectifying tower I, a main condenser-evaporator I, a rectifying tower II, a main condenser-evaporator II, a rectifying tower III, a main condenser-evaporator III, a supercooler, an expander I and an expander II;

the filter, the air compressor, the air pre-cooling unit, the alternately used molecular sieve adsorbers and the electric heater are disposed outside a cold box, the main heat exchanger, the rectifying tower I, the main condenser-evaporator I, the rectifying tower II, the main condenser-evaporator II, the rectifying tower III, the main condenser-evaporator III, the supercooler, the expander I and the expander II are disposed inside the cold box, the main condenser-evaporator I is disposed on the rectifying tower I, the main condenser-evaporator II is disposed on the rectifying tower II, and the main condenser-evaporator III is disposed in a bottom of the rectifying tower III;

the filter, the air compressor, the air pre-cooling unit, the alternately used molecular sieve adsorbers and the main heat exchanger are connected sequentially, and the main heat exchanger is connected to an air inlet at a bottom of the rectifying tower I;

an oxygen-enriched liquid air outlet at the bottom of the rectifying tower I is connected to the supercooler, the supercooler is connected to the main condenser-evaporator I, a connecting pipe between the supercooler and the main condenser-evaporator I is provided with a first throttle valve, an oxygen-enriched air outlet of the main condenser-evaporator I is connected to a bottom of the rectifying tower II, and an oxygen-enriched liquid air outlet of the main condenser-evaporator I is connected to the main condenser-evaporator II;

a pressurized nitrogen outlet at a top of the rectifying tower I is respectively connected to pressurized nitrogen reheating/partial reheating inlets of the main condenser-evaporator I, the main condenser-evaporator III and the main heat exchanger, a liquid nitrogen outlet of the main condenser-evaporator I is connected to a liquid nitrogen buffer tank, the liquid nitrogen buffer tank is respectively connected to the top of the rectifying tower I, a top of the rectifying tower II and a liquid nitrogen product supply pipe, and a connecting pipe between the liquid nitrogen buffer tank and the top of the rectifying tower II is provided with a second throttle valve; a pressurized nitrogen reheating outlet and a pressurized nitrogen partial reheating outlet of the main heat exchanger are respectively connected to a high-pressure nitrogen product supply pipe and the expander I, the expander I is connected to a low-pressure nitrogen reheating inlet of the main heat exchanger, and a low-pressure nitrogen reheating outlet of the main heat exchanger is connected to a low-pressure nitrogen product supply pipe;

an oxygen-enriched liquid air outlet at the bottom of the rectifying tower II is respectively connected to the main condenser-evaporator II and a top of the rectifying tower III, and connecting pipes between the oxygen-enriched liquid air outlet at the bottom of the rectifying tower II and the main condenser-evaporator II and between the oxygen-enriched liquid air outlet at the bottom of the rectifying tower II and the top of the rectifying tower III are respectively provided with a third throttle valve and a fourth throttle valve; a waste nitrogen outlet of the main condenser-evaporator II is connected to the supercooler, the supercooler is connected to a waste nitrogen reheating inlet of the main heat exchanger, a waste nitrogen reheating outlet of the main heat exchanger is respectively connected to a vent pipe and the electric heater, and the electric heater is connected to the alternately used molecular sieve adsorbers;

a low-pressure nitrogen outlet at the top of the rectifying tower II is respectively connected to low-pressure nitrogen reheating inlets of the main condenser-evaporator II and the main heat exchanger, and a liquid nitrogen outlet of the main condenser-evaporator II is connected to the top of the rectifying tower II;

an oxygen outlet of the rectifying tower III is connected to the main heat exchanger, the main heat exchanger is connected to an oxygen product supply pipe, a liquid nitrogen outlet of the main condenser-evaporator III is connected to the liquid nitrogen buffer tank, and a liquid oxygen outlet of the rectifying tower III is connected to a liquid oxygen product supply pipe;

pressurized waste nitrogen at the top of the rectifying tower III is connected to the supercooler, the supercooler is connected to a pressurized waste nitrogen partial reheating inlet of the main heat exchanger, a pressurized waste nitrogen partial reheating outlet of the main heat exchanger is connected to the expander II, and the expander II is connected to the waste nitrogen reheating inlet of the main heat exchanger;

the process comprises the following steps:

step I: after dust and mechanical impurities are removed from raw air through the filter, sending the filtered air to the air compressor such that the filtered air is compressed to a set pressure; then pre-cooling the compressed air by the air pre-cooling unit, and purifying the pre-cooled air by the alternately used molecular sieve adsorbers to obtain a purified air;

step II: a part of the purified air serves as instrument air, and a remaining part of the purified air is sent to the main heat exchanger such that the remaining part of the purified air is cooled to a saturation temperature and has a moisture content, which is then sent into the bottom of the rectifying tower I to participate in first rectification;

step III: after the air that participates in the first rectification is rectified by the rectifying tower I, obtaining a first oxygen-enriched liquid air and pressurized nitrogen, the first oxygen-enriched liquid air is supercooled by the supercooler, throttled by the first throttle valve and sent into the main condenser-evaporator I to exchange heat with the pressurized nitrogen as a cold source of the main condenser-evaporator I such that the first oxygen-enriched liquid air is vaporized into oxygen-enriched air, introducing the oxygen-enriched air into the bottom of the rectifying tower II to participate in second rectification, and at the same time, introducing a part of the first oxygen-enriched liquid air from the main condenser-evaporator I into the main condenser-evaporator II to serve as a part of a cold source of the main condenser-evaporator II; introducing a first part of the pressurized nitrogen into the main condenser-evaporator I to exchange heat with the first oxygen-enriched liquid air as a heat source of the main condenser-evaporator I such that the pressurized nitrogen is liquefied into a first liquid nitrogen, combining the first liquid nitrogen with a second liquid nitrogen introduced from the main condenser-evaporator III, introducing a first part of the combined liquid nitrogen into the top of the rectifying tower I to serve as a reflux, a second part of the combined liquid nitrogen is throttled by the second throttle valve and introduced into the top of the rectifying tower II to participate in the second rectification, and discharging a third part of the combined liquid nitrogen as a liquid nitrogen product; introducing a second part of the pressurized nitrogen into the main condenser-evaporator III to serve as a heat source of the main condenser-evaporator III, a third part of the pressurized nitrogen is sent into the main heat exchanger, a part of the third part of the pressurized nitrogen is reheated by the main heat exchanger and sent out of the cold box to serve as a high-pressure nitrogen product having a purity of less than 3 ppm $O_2$ and a pressure of 0.68-0.95 MpaG, and a remaining part of the third part of the pressurized nitrogen is partially reheated by the main heat exchanger, expanded by the expander I, reheated by the main heat exchanger and sent out of the cold box to serve as a low-pressure nitrogen product having a purity of less than 3 ppm $O_2$ and a pressure of 0.3-0.5 MpaG;

step IV: after the liquid nitrogen that participates in the second rectification and the oxygen-enriched air are rectified by the rectifying tower II, obtaining a second oxygen-enriched liquid air from the bottom of the rectifying tower II, and obtaining low-pressure nitrogen from the top of the rectifying tower II; a first part of the second oxygen-enriched liquid air is throttled by the third throttle valve and sent into the main condenser-evaporator II to exchange heat with the low-pressure nitrogen as another part of the cold source of the main condenser-evaporator II such that the first part of the second oxygen-enriched liquid air is vaporized into waste nitrogen, the waste nitrogen is reheated by the supercooler and is sent into the main heat exchanger to form a first part of a waste nitrogen that is sent into the main heat exchanger, and a second part of the second oxygen-enriched liquid air is throttled by the fourth throttle valve and sent into the top of the rectifying tower III to participate in third rectification; introducing a part of the low-pressure nitrogen into the main condenser-evaporator II to exchange heat with the first part of the second oxygen-enriched liquid air as a heat source of the main condenser-evaporator II such that the part of the low-pressure nitrogen is liquefied into a third liquid nitrogen, introducing the third liquid nitrogen into the top of the rectifying tower II to serve as a reflux, and reheating a remaining part of the low-pressure nitrogen by the main heat exchanger to serve as a low-pressure nitrogen product having a purity of less than 3 ppm $O_2$ and a pressure of 0.3-0.5 MpaG;

step V: after the second part of the second oxygen-enriched liquid air is rectified by the rectifying tower III, obtaining liquid oxygen and pressurized waste nitrogen, a first part of the liquid oxygen is served as a cold source of the main condenser-evaporator III and exchanges heat with the second part of the pressurized nitrogen introduced from the rectifying tower I such that the first part of the liquid oxygen is vaporized into gaseous oxygen, and a part of the gaseous oxygen is reheated by the main heat exchanger and sent out of the cold box as an oxygen product and a remaining part of the gaseous oxygen is served as uprising gas of the rectifying tower III, wherein the oxygen product has a purity of 90-99.6% and a pressure of 0.1-0.3 MpaG; liquefying the second part of the pressurized nitrogen into the second liquid nitrogen, and at the same time, introducing a second part of the liquid oxygen from the bottom of the rectifying tower III to serve as a liquid oxygen product; and the pressurized waste nitrogen is reheated by the supercooler, partially reheated by the main heat exchanger and expanded by the expander II, then the expanded waste nitrogen is sent into the main heat exchanger to form a second part of the waste nitrogen that is sent into the main heat exchanger, the waste nitrogen that is sent into the main heat exchanger is reheated by the main heat exchanger and sent out of the cold box, and a part of the waste nitrogen that is sent out of the cold box is served as the regeneration gas of the alternately used molecular sieve adsorbers and a remaining part of the waste nitrogen that is sent out of the cold box is vented.

2. The process according to claim 1, wherein in the step I, the air is compressed by the air compressor to 0.75-1.0 MPa.

3. The process according to claim 1, wherein in the step I, the air is pre-cooled by the air pre-cooling unit to 5-8° C.

* * * * *